(12) United States Patent
Chuang

(10) Patent No.: US 7,613,094 B2
(45) Date of Patent: Nov. 3, 2009

(54) OPTICAL DISC DRIVE

(75) Inventor: Chih-Peng Chuang, Taipei (TW)

(73) Assignee: Inventec Corporation, Taipei (TW)

( * ) Notice: Subject to any disclaimer, the term of this patent is extended or adjusted under 35 U.S.C. 154(b) by 662 days.

(21) Appl. No.: 11/367,817

(22) Filed: Mar. 3, 2006

(65) Prior Publication Data
US 2007/0050800 A1 Mar. 1, 2007

(30) Foreign Application Priority Data
Aug. 25, 2005 (TW) .............................. 94214598 U

(51) Int. Cl.
*G11B 33/02* (2006.01)
(52) U.S. Cl. .................. 369/75.21; 369/77.11
(58) Field of Classification Search ................ 369/77.2, 369/77.1, 75.21, 75.11, 77.11, 77.21; 361/685, 361/747; 439/352, 476.1
See application file for complete search history.

(56) References Cited

U.S. PATENT DOCUMENTS 6,567,363 B1 * 5/2003 Juman et al. ................. 720/631

2006/0166543 A1 * 7/2006 Wu ............................ 439/352

FOREIGN PATENT DOCUMENTS

TW  570265  12/1991

* cited by examiner

*Primary Examiner*—Ali Neyzari
(74) *Attorney, Agent, or Firm*—Peter F. Corless; Steven M. Jensen; Edwards Angell Palmer & Dodge LLP

(57) ABSTRACT

An optical disc drive is provided for being mounted in a predetermined slot of a casing of an electronic device, the slot having a mounting portion for being connected to the optical disc drive. The optical disc drive includes a main body; a transfer board having a connector for connecting the main body to the electronic device and at least one opening formed at a side of the connector; and an insulation plate disposed between the main body and the transfer board, and having at least one connecting portion for passing through the opening of the transfer board to be connected to the mounting portion of the slot of the casing, so as to fix the optical disc drive to the casing of the electronic device. The optical disc drive can easily be assembled to and disassembled from the electronic device without the need of an additional frame.

6 Claims, 6 Drawing Sheets

OPTICAL DISC DRIVE

FIELD OF THE INVENTION

The present invention relates to optical disc drives, and more particularly, to an optical disc drive easy to be assembled to or disassembled from a casing of an electronic device without the need of an additional frame.

BACKGROUND OF THE INVENTION

Computer-related electronic devices have been increasingly developed along with the progress of information technology and played an important role in human life. The electronic devices are required to provide various functions and have low fabrication costs in response to the competitive nature of the market.

Therefore, during fabrication of the electronic devices, not only maintenance of satisfactory product quality and manufacturing speed but also reduction in fabrication costs should all be considered. Particularly, each stage in the production line, such as the assembly speed of an optical disc drive to a casing of an electronic device, may affect the overall manufacturing progress.

Conventionally, an optical disc drive is assembled to a computer by using a tray and a plurality of screws. Referring to FIG. 1, during assembling the optical disc drive to the computer, the optical disc drive 10 is mounted to a tray 12 by a plurality of screws (not shown), and then the tray 12 is fixed to a casing of the computer by means of a fixing structure 120 disposed at a side of the tray 12. In general, the casing of the computer must be provided with a concave portion for being engaged with the fixing structure 120 of the tray 12. When the optical disc drive 10 needs to be repaired or replaced due to malfunction thereof, the casing of the computer, the tray 12 and the optical disc drive 10 should all be disassembled in order by unscrewing the plurality of screws, thereby wasting much time and labor. Accordingly, the conventional arrangement of using the tray 12 to fasten the optical disc drive 10 to the computer undesirably requires a complex assembling/disassembling process and is cost-ineffective to implement due to the need of additionally providing the tray 12 with the fixing structure 120.

To overcome the above drawback of complexity in assembly or disassembly of the optical disc drive, Taiwanese Patent No. 570265 has disclosed an optical disc drive easy to be assembled and disassembled to and from a computer. Referring to FIGS. 2 and 3, the optical disc drive 20 is assembled to a casing 3 of the computer by an engaging component 22. The engaging component 22 has an engaging portion 220 formed at a bottom side thereof. When the engaging component 22 is fastened to the optical disc drive 20 by screws 24, the engaging portion 220 of the engaging component 22 can be engaged with another engaging portion 30 disposed on the casing 3 of the computer, thereby fixing the optical disc drive 20 to the casing 3 of the computer. On the other hand, the engaging portion 220 of the engaging component 22 can be separated from the engaging portion 30 of the casing 3 of the computer by pressing the engaging portion 220, such that the optical disc drive 20 is detached from the casing 3 of the computer.

However, the above arrangement requires the additional engaging component 22 for the optical disc drive 20 and the corresponding engaging portion 30 on the casing 3 of the computer to assemble the optical disc drive to the casing of the computer, thereby complicating the fabrication processes and increasing the fabrication costs.

A general optical disc drive comprises a main body, an insulation plate, a transfer board and screws. It is therefore desired to provide an improved optical disc drive with structural modifications of the inherent components thereof so as to allow the optical disc drive to be easily assembled to and disassembled from an electronic device, without using additionally components, thereby reducing the fabrication costs thereof.

SUMMARY OF THE INVENTION

In light of the above drawbacks in the prior art, an objective of the present invention is to provide an optical disc drive, which is easy to be assembled to and disassembled from a casing of an electronic device.

Another objective of the present invention is to provide a low-cost optical disc drive.

Still another objective of the present invention is to provide an optical disc drive, which can be assembled to a casing of an electronic device without the need of any additional frame and any tool.

A further objective of the present invention is to provide an optical disc drive, which can enhance a fixing effect of a rear plate of a casing of an electronic device.

To achieve the above and other objectives, the present invention proposes an optical disc drive to be mounted in a predetermined slot of a casing of an electronic device, the slot having a mounting portion for being connected to the optical disc drive. The optical disc drive includes a main body; a transfer board having a connector for connecting the main body to the electronic device and at least one opening formed at a side of the connector; and an insulation plate disposed between the main body and the transfer board, and having at least one connecting portion for passing through the opening of the transfer board to be connected to the mounting portion of the slot of the casing of the electronic device, so as to fix the optical disc drive to the slot of the casing of the electronic device. The optical disc drive can be a slim type optical disc driver.

The main body comprises an input/output port and a plurality of coupling holes, which are all formed at a side of the main body.

The transfer board has a transfer port corresponding to the input/output port of the main body and a plurality of screw holes corresponding to the coupling holes of the main body. Further, the opening of the transfer board is a notch extended inwardly from a side edge of the transfer board to the connector of the transfer board.

The insulation plate is formed with through holes respectively corresponding to the transfer port and the connector of the transfer board. The insulation plate is further formed with screw holes corresponding to the coupling holes of the main body and the screw holes of the transfer board, such that screws can be used to pass through the screw holes of the transfer board and the insulation plate to be engaged with the coupling holes of the main body so as to assemble the transfer board and the insulation plate to the main body. Preferably, the connecting portion of the insulation plate is a hook for being connected to the mounting portion of the casing of the electronic device.

The casing of the electronic device further comprises a rear plate. The connecting portion of the insulation plate can pass through the opening of the transfer board to be connected to the mounting portion of the slot of the casing, so as to fix the optical disc drive to the casing of the electronic device and fix the rear plate of the electronic device.

Therefore, the optical disc drive of the present invention has the inherent insulation plate being formed with the connecting portion that can be used to fix the optical disc drive to the casing of the electronic device, without the need of an additional frame, thereby decreasing the fabrication costs. As the connecting portion is preferably a hook that can be coupled to the casing of the electronic device to assemble the optical disc drive to the casing of the electronic device without using any tool, thereby improving the convenience in assembly/disassembly of the optical disc drive to/from the electronic device. The connecting portion or hook can further be coupled to the rear plate of the electronic device when the optical disc drive is fastened to the casing of the electronic device, such that the rear plate can be securely fixed in position.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

Preferred embodiments of an optical disc drive proposed in the present invention are described as follows with reference to FIGS. 4 to 7.

Figure 1:
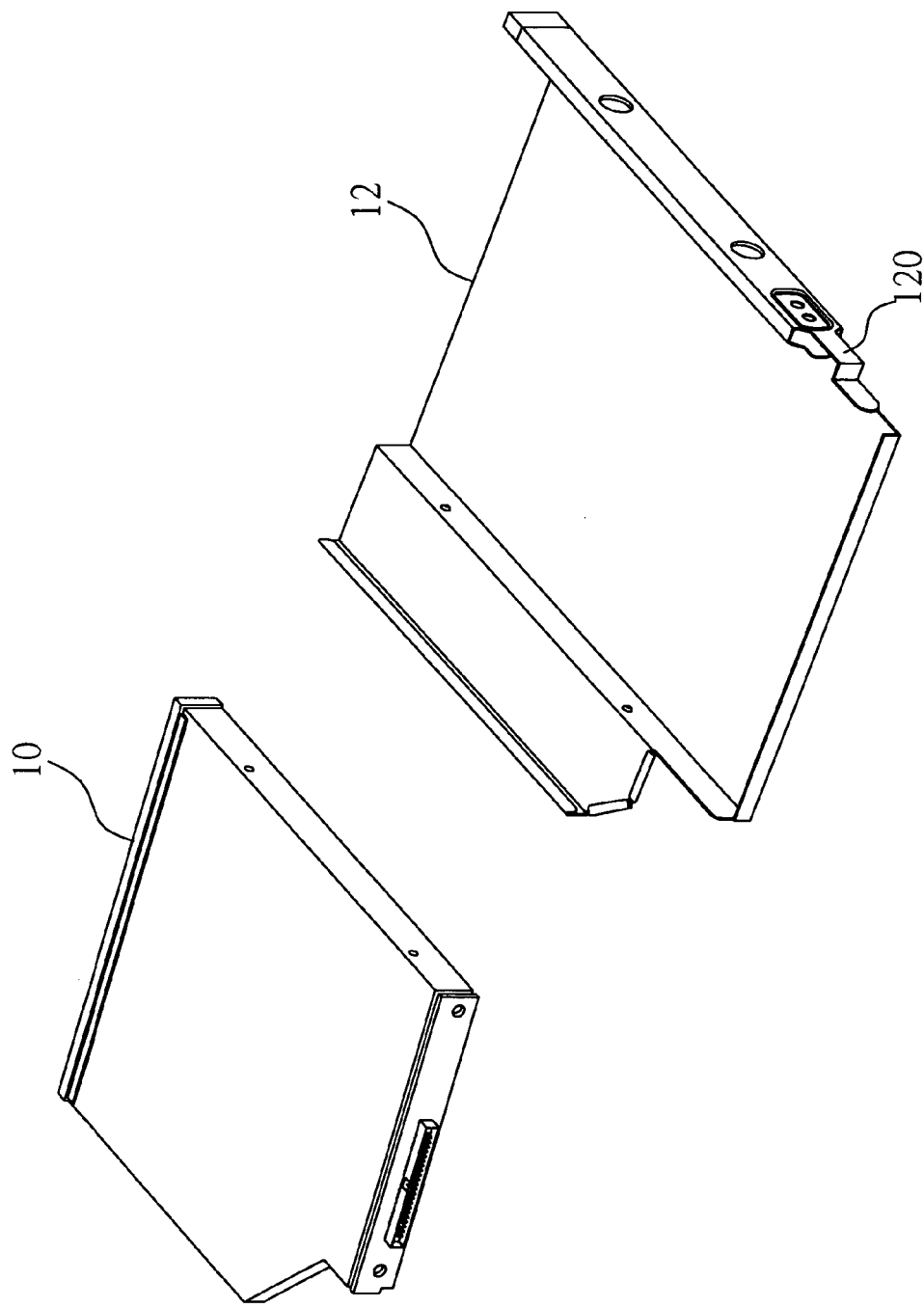
FIG. 1 (PRIOR ART) is a perspective view of a conventional optical disc drive to be assembled to a computer by means of a tray.
Figure 2:
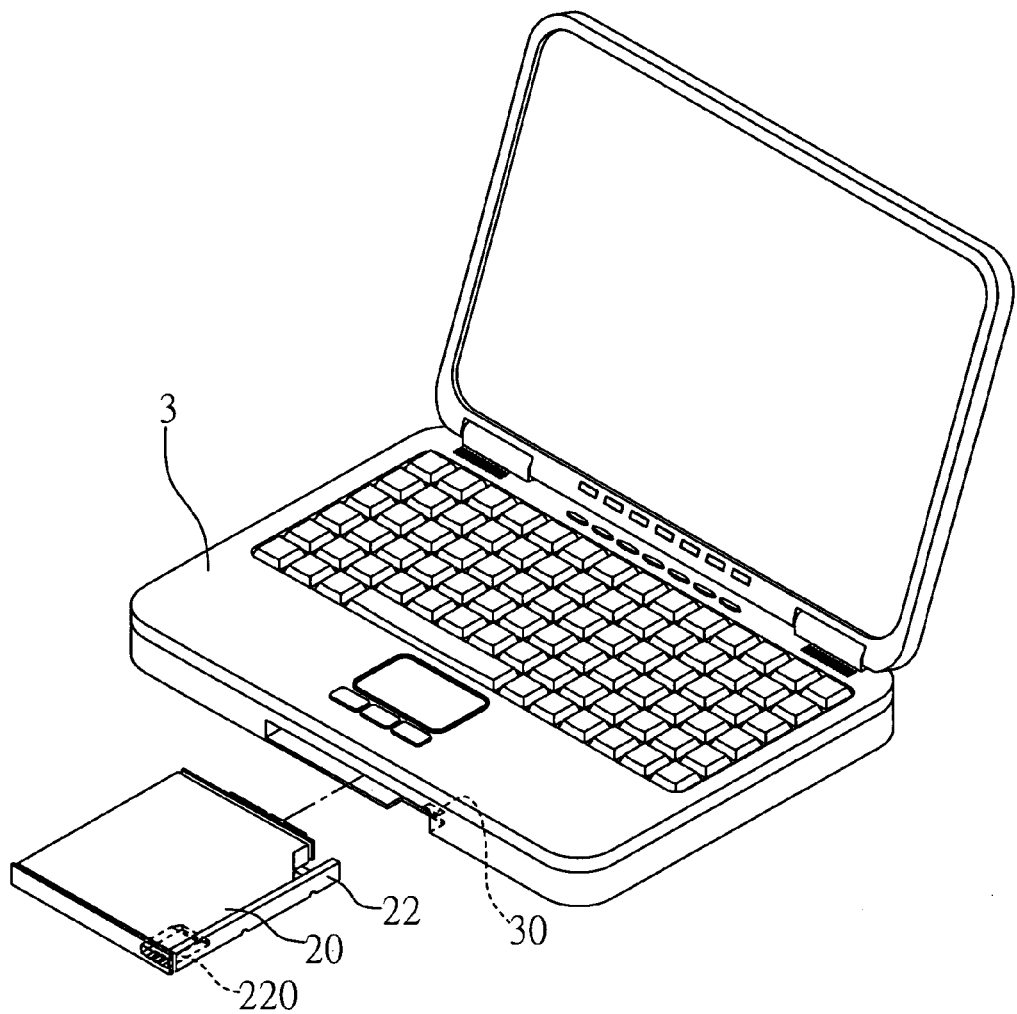
FIG. 2 (PRIOR ART) is a perspective view of a conventional optical disc drive to be assembled to a casing of a computer.
Figure 3:
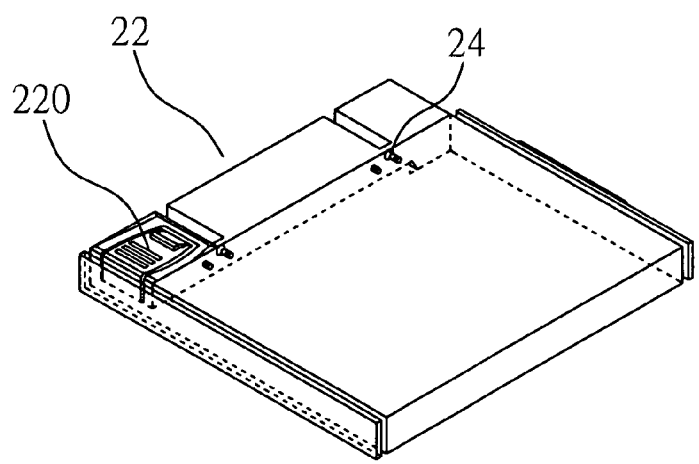
FIG. 3 (PRIOR ART) is a bottom perspective view of the optical disc drive shown in FIG. 2.
Figure 4:
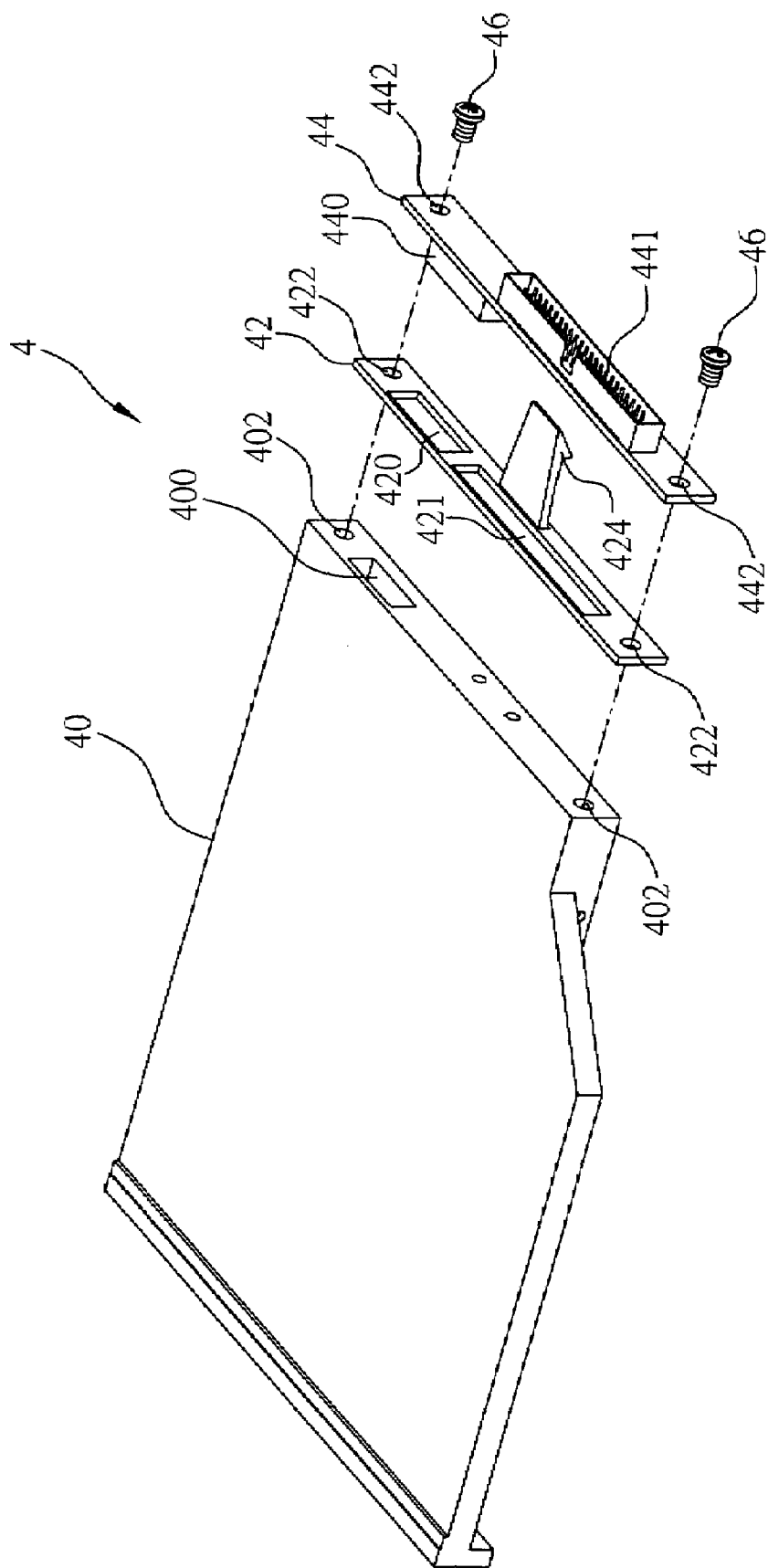
FIG. 4 is an exploded perspective view of an optical disc drive according to the present invention.

Referring to FIG. 4, the optical disc drive 4 of the present invention comprises a main body 40, an insulation plate 42 and a transfer board 44. In this embodiment, the optical disc drive 4 can be a slim type optical disc drive, and is mounted in a predetermined slot (not shown) of a casing 5 of an electronic device (see FIG. 7), wherein the slot has a mounting portion for being connected to the optical disc drive 4.

The main body 40 comprises an input/output port 400 and a plurality of coupling holes 402, which are all formed at a side of the main body 40. The transfer board 44 comprises a connector 441 for connecting the main body 40 to the electronic device, and at least one opening 426 formed at a side of the connector 441 (see FIG. 6). The transfer board 44 further comprises a transfer port 440 corresponding to the input/output port 400 of the main body 40, and a plurality of screw holes 442 corresponding to the coupling holes 402 of the main body 40.

The opening 426 of the transfer board 44 is a notch extended inwardly from a side edge of the transfer board 44 to the connector 441.

The insulation plate 42 is disposed between the main body 40 and the transfer board 44, and has a plurality of through holes 420, 421 corresponding to the transfer port 440 and the connector 441 of the transfer board 44 respectively. The transfer port 440 of the transfer board 44 is allowed to pass through the through hole 420 of the insulation plate 42 to be engaged with the input/output port 400 of the main body 40, and wires of the main body 40 are allowed to pass through the through hole 421 of the insulation plate 42 to be connected to the connector 441 of the transfer board 44. The insulation plate 42 further comprises at least one connecting portion 424 disposed at a lower side of the through hole 421 and capable of passing through the opening 426 of the transfer board 44. The insulation plate 42 further comprises screw holes 422 corresponding to the coupling holes 402 of the main body 40 and the screw holes 442 of the transfer board 44, such that screws 46 can be used to pass through the screw holes 442, 422 to be engaged with the coupling holes 402 of the main body 40, so as to assemble the transfer board 44 and the insulation plate 42 to the main body 40.

In this embodiment, the connecting portion 424 of the insulation plate 42 is a hook for being connected to the mounting portion of the casing 5 of the electronic device.

Figure 5:
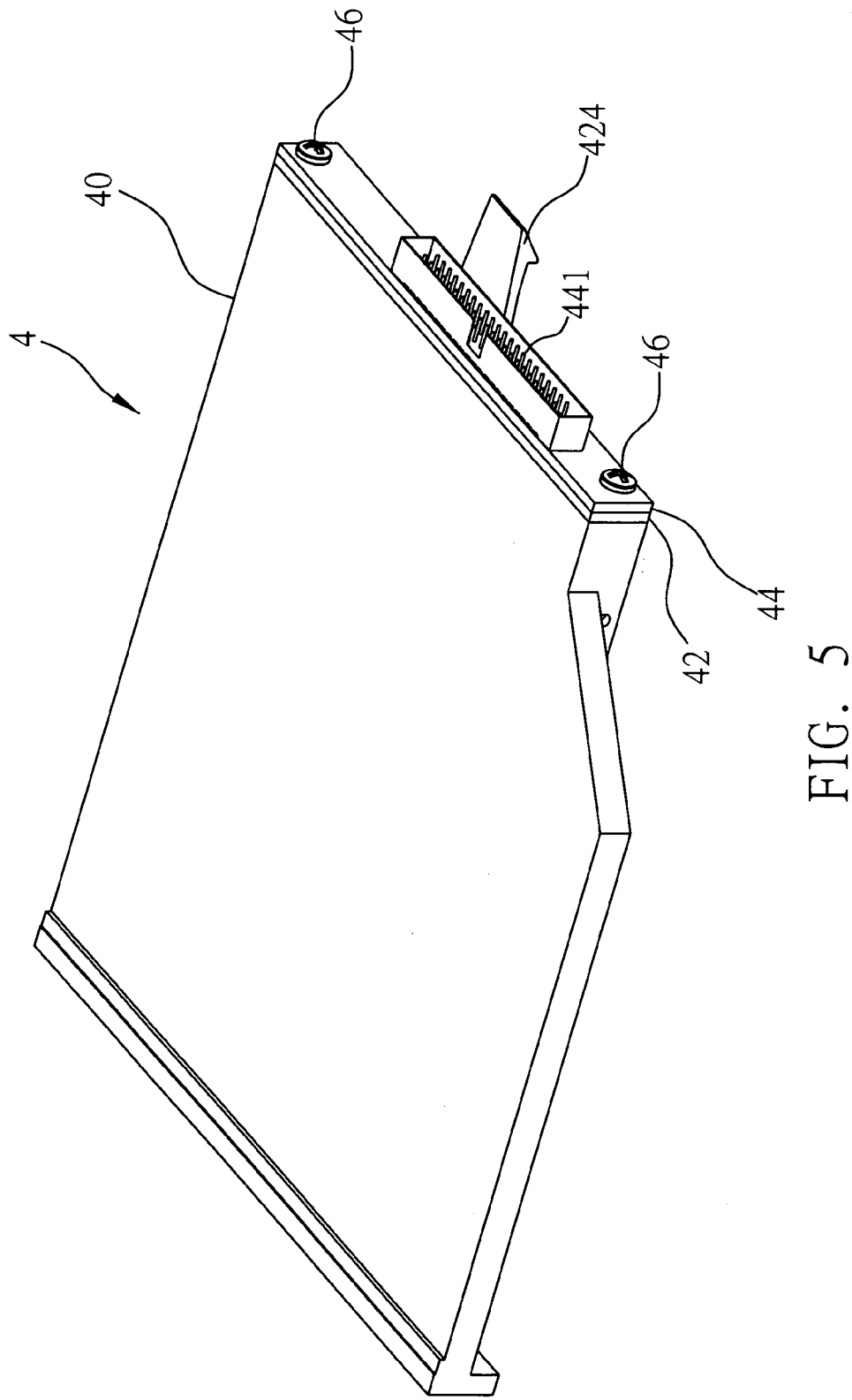
FIG. 5 is an assembly perspective view of the optical disc drive according to the present invention.
Figure 6:
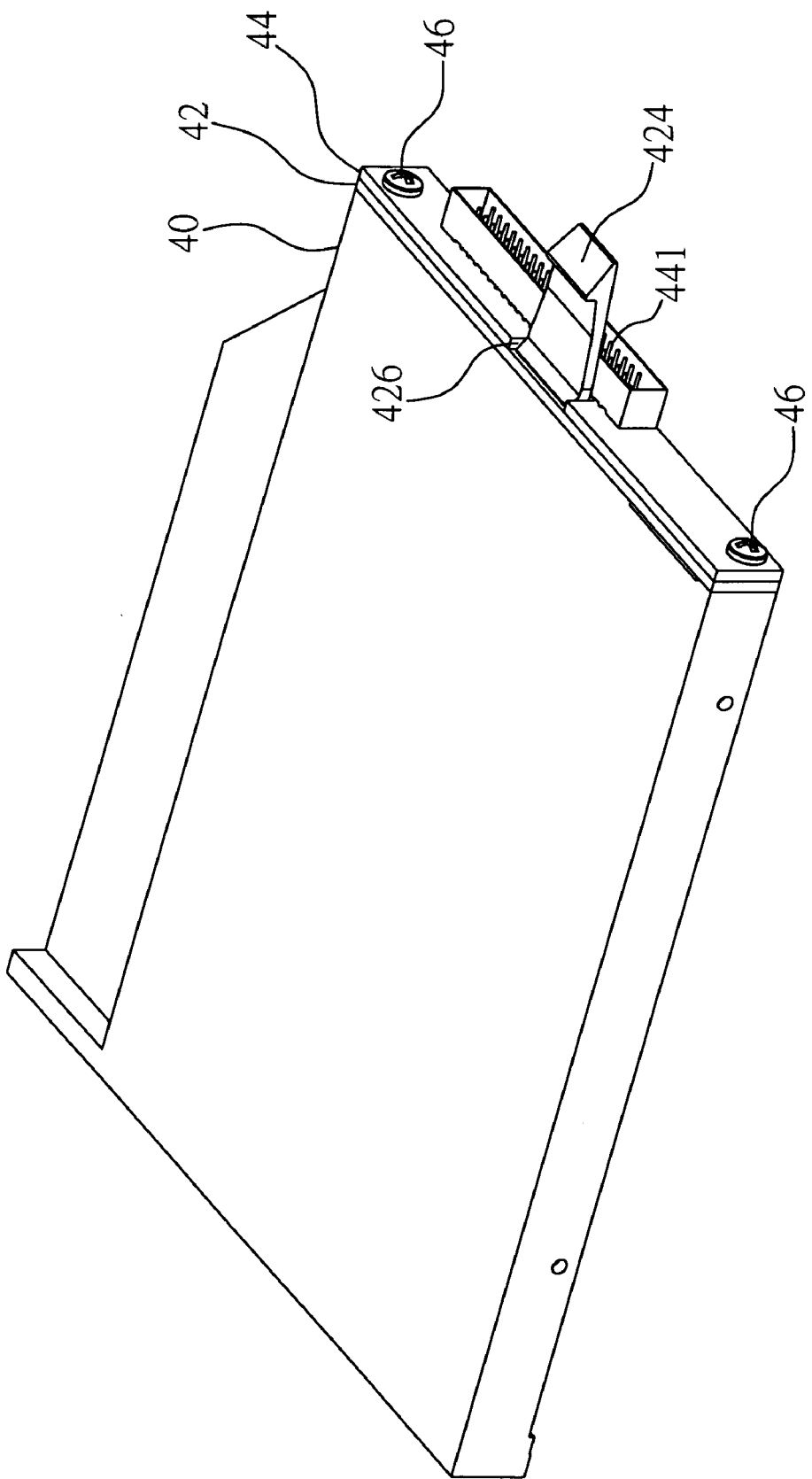
FIG. 6 is a bottom perspective view of the optical disc drive according to the present invention.
Figure 7:
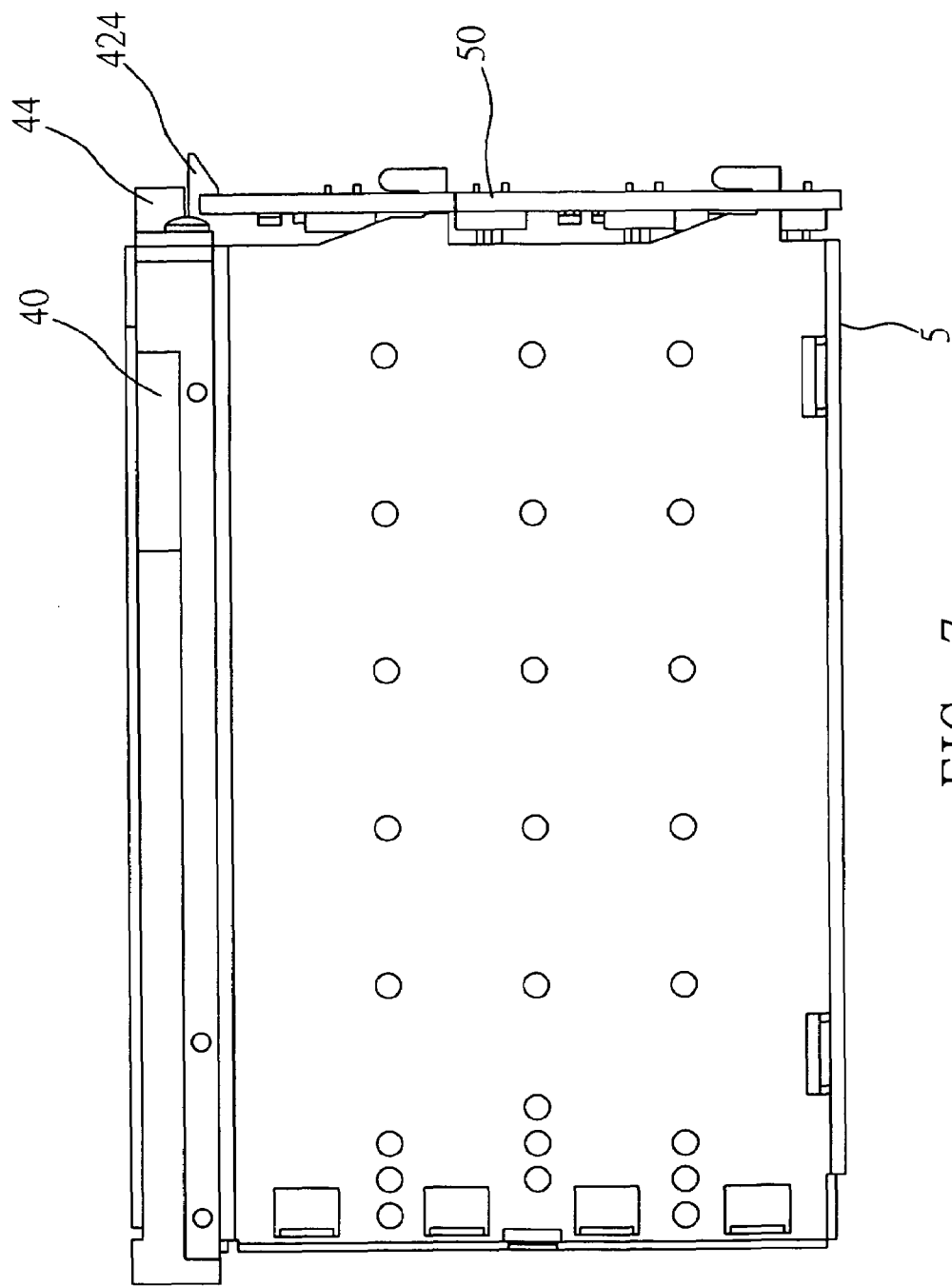
FIG. 7 is a side view of a casing of an electronic device assembled with the optical disc drive according to the present invention.

Referring to FIGS. 5 and 6, to assemble the transfer board 44 and the insulation plate 42 to the main body 40, the transfer port 440 of the transfer board 44 passes through the through hole 420 of the insulation plate 42 to be engaged with the input/output port 400 of the main body 40, the connecting portion 424 of the insulation plate 42 passes through the opening 426 of the transfer board 44, and the screws 46 pass through the screw holes 442, 422 of the transfer board 44 and the insulation plate 42 to be engaged with the coupling holes 402 of the main body 40, such that the transfer board 44 and the insulation plate 42 are assembled to the main body 40. Further, the connecting portion 424 of the insulation plate 42 is coupled to the mounting portion of the slot of the casing 5 of the electronic device to fix the optical disc drive 4 to the casing 5 of the electronic device. Referring to FIG. 7, the casing 5 of the electronic device comprises a rear plate 50 formed at a rear end of the casing 5. To assemble the optical disc drive 4 to the casing 5 of the electronic device, the optical disc drive 4 is disposed in the slot of the casing 5, and the connecting portion 424 of the insulation plate 42 passes through the opening 426 of the transfer board 44 to be connected to the mounting portion of the slot of the casing 5, such that the optical disc drive 4 is fastened to the casing 5 of the electronic device, and the connecting portion 424 of the insulation plate 42 is also engaged with the rear plate 50 to thereby enhance the fixing effect of the rear plate 50.

Therefore, the optical disc drive of the present invention has the inherent insulation plate being formed with the connecting portion that can be used to fix the optical disc drive to the casing of the electronic device, without the need of an additional frame, thereby decreasing the fabrication costs. As the connecting portion is preferably a hook that can be coupled to the casing of the electronic device to assemble the optical disc drive to the casing of the electronic device without using any tool, thereby improving the convenience in assembly/disassembly of the optical disc drive to/from the electronic device. The connecting portion or hook can further be coupled to the rear plate of the electronic device when the optical disc drive is fastened to the casing of the electronic device, such that the rear plate can be securely fixed in position.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An optical disc drive for being mounted in a predetermined slot of a casing of an electronic device, the slot having a mounting portion for being connected to the optical disc drive, the optical disc drive comprising:
    a main body;
    a transfer board comprising:
        a connector for connecting the main body to the electronic device; and
        at least one opening formed at a side of the connector; and
    an insulation plate disposed between the main body and the transfer board, the insulation plate having at least one connecting portion for passing through the opening of the transfer board to be connected to the mounting portion of the slot of the casing of the electronic device so as to fix the optical disc drive to the casing of the electronic device,
    wherein the casing of the electronic device comprises a rear plate that is fixed by the connecting portion passing through the opening of the transfer board to be connected to the mounting portion of the slot of the casing and fix the optical disc drive to the casing of the electronic device.

2. The optical disc drive of claim 1, wherein the optical disc drive is a slim type optical disc drive.

3. The optical disc drive of claim 1, wherein the main body comprises an input/output port and a plurality of coupling holes, which are formed at a side of the main body.

4. The optical disc drive of claim 3, wherein the transfer board comprises a transfer port corresponding to the input/output port of the main body.

5. The optical disc drive of claim 1, wherein the opening of the transfer board is a notch extended inwardly from a side edge of the transfer board to the connector.

6. The optical disc drive of claim 1, wherein the connecting portion of the insulation plate is a hook.

* * * * *